(12) United States Patent
Alexander et al.

(10) Patent No.: US 8,285,979 B2
(45) Date of Patent: *Oct. 9, 2012

(54) BOOT ALGORITHM

(75) Inventors: Alan Alexander, Chipping Sodbury (GB); Philippe Guasch, Le Bar-sur-Loup (FR)

(73) Assignee: Icera Inc., Wilmington, DE (US)

( * ) Notice: Subject to any disclaimer, the term of this patent is extended or adjusted under 35 U.S.C. 154(b) by 426 days.

This patent is subject to a terminal disclaimer.

(21) Appl. No.: 12/580,249

(22) Filed: Oct. 15, 2009

(65) Prior Publication Data

US 2010/0095106 A1 Apr. 15, 2010

(30) Foreign Application Priority Data

Oct. 15, 2008 (GB) .................................. 0818918.5

(51) Int. Cl.
*G06F 9/24* (2006.01)
(52) U.S. Cl. ................................. 713/2; 713/1; 713/100
(58) Field of Classification Search .................. 713/1, 2, 713/100
See application file for complete search history.

(56) References Cited

U.S. PATENT DOCUMENTS

| 7,334,117 B2 * | 2/2008 | Wilson et al. ................... 713/1 |
| 8,024,557 B2 * | 9/2011 | Cumming et al. ............... 713/2 |
| 2007/0260868 A1 * | 11/2007 | Azzarello et al. ............... 713/2 |

FOREIGN PATENT DOCUMENTS

WO  WO2006/117562 A1  11/2006

* cited by examiner

*Primary Examiner* — Thuan Du

(57) ABSTRACT

A method, chip and computer program product for booting from a secondary boot source. In one embodiment, the method includes: (1) retrieving primary boot code from an on-chip primary boot source on the same chip as a processor, the primary boot code comprising at least a boot discovery algorithm for determining the location of an external secondary boot source external to said chip, (2) executing the primary boot code on the processor, including the boot discovery algorithm, thus operating the processor to check each of a plurality of locations to determine the location of the external secondary boot source, (3) retrieving the secondary boot code from the determined location and (4) continuing the booting of the processor by executing the secondary boot code on the processor.

22 Claims, 2 Drawing Sheets

BOOT ALGORITHM

CROSS REFERENCE TO RELATED APPLICATION

Figure 1:
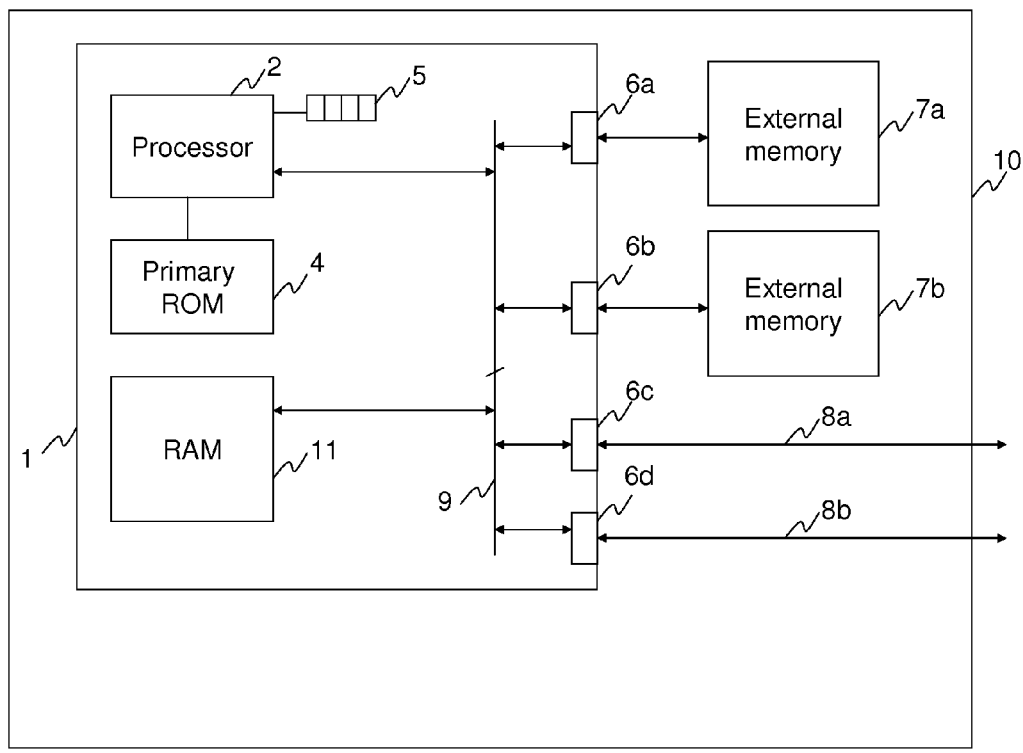

This Application claims the benefit of GB Patent Application No. 0818918.5 filed on Oct. 15, 2008, entitled "BOOT ALGORITHM," commonly assigned with the present invention and incorporated herein by reference.

TECHNICAL FIELD

This disclosure relates to, in general, the start-up of processors and, more specifically, to starting-up microprocessors associated with an integrated circuit (IC) chip.

BACKGROUND

ICs that include a microprocessor require a mechanism by which they start-up, or "Boot", when they are turned on or reset.

Since they include a programmable microprocessor, such ICs are flexible enough to be designed into a variety of products. However, different products may require the IC to behave in different ways. While the majority of these differences can be accommodated by making changes to software, a mechanism is still needed to load the necessary code into the IC at boot time. Unfortunately this very mechanism may also be application specific. For example, in some applications the boot code may be stored in one of several types of external non-volatile memory chip, while in others the IC may be expected to load its boot code using one of a variety of serial communications links.

Where a plurality of sources of boot code are possible, the desired source may be indicated by blowing fuse latches such as electronic "e-fuses" on the chip. Typically each fuse represents one bit, e.g., with a blown fuse representing a logic-one and an un-blown fuse representing a logic-zero, such that a binary value can be written into one or more of such latches. The processor may include a mechanism which maps possible values of the fuse latches onto different respective sources of boot code. When the processor boots, the mechanism automatically fetches boot code from a location dependent on the value blown into the fuse latch or latches.

However, this has the disadvantage that once the fuses are blown, the boot source becomes permanently fixed. As such, a more flexible boot mechanism may be advantageous.

SUMMARY

According to one aspect of the present invention, there is provided a method of booting a processor of an IC chip. In one embodiment, the method includes: (1) retrieving primary boot code from an on-chip primary boot source on the same chip as the processor, the primary boot code comprising at least a boot discovery algorithm for determining the location of an external secondary boot source external to the chip, (2) executing the primary boot code on the processor, including the boot discovery algorithm, thus operating the processor to check each of a plurality of locations to determine the location of the external secondary boot source, (3) retrieving the secondary boot code from the determined location and (4) continuing the booting of the processor by executing the secondary boot code on the processor.

According to a further aspect of the present invention, there is provided an IC chip. In one embodiment, the IC chip includes: (1) an on-chip storage means being a primary boot source storing primary boot code, (2) a plurality of input locations each being a potential location of an external secondary boot source storing secondary boot code and (3) a processor operatively coupled to the primary boot source and to the plurality of input locations, wherein the processor is configured to, upon booting, automatically retrieve and execute the primary boot code from the primary boot source, and the primary boot code includes at least a boot discovery algorithm for determining the location of an external secondary boot source external to the chip, the algorithm being configured so as when executed to operate the processor to check each of the locations to determine the location of the external secondary boot source, retrieve the secondary boot code from the determined location, and continue the booting by executing the secondary boot code.

According to another aspect of the present invention, there is provided computer program product. In one embodiment, the computer program product includes code which when executed on a processor performs the steps of: (1) beginning booting of the processor from a primary boot source including a boot discovery algorithm, thus operating the processor to check each of a plurality of locations to determine the location of the external secondary boot source, (2) retrieving the secondary boot code from the determined location and (3) continuing the booting of the processor by executing the secondary boot code on the processor.

According to yet another aspect of the present invention, there is provided user equipment having a wireless transceiver and an IC chip. In one embodiment, the IC chip includes: (1) an on-chip storage means being a primary boot source storing primary boot code, (2) a plurality of input locations each being a potential location of an external secondary boot source storing secondary boot code and (3) a processor operatively coupled to the primary boot source and to the plurality of input locations. In this embodiment, the processor is configured to, upon booting, automatically retrieve and execute the primary boot code from the primary boot source, and the primary boot code includes at least a boot discovery algorithm for determining the location of an external secondary boot source external to the chip, the algorithm being configured so as when executed to operate the processor to check each of the locations to determine the location of the external secondary boot source, retrieve the secondary boot code from the determined location, and continue the booting by executing the secondary boot code in order to configure the processor for communication over a wireless cellular network via the wireless transceiver.

BRIEF DESCRIPTION

Figure 2:
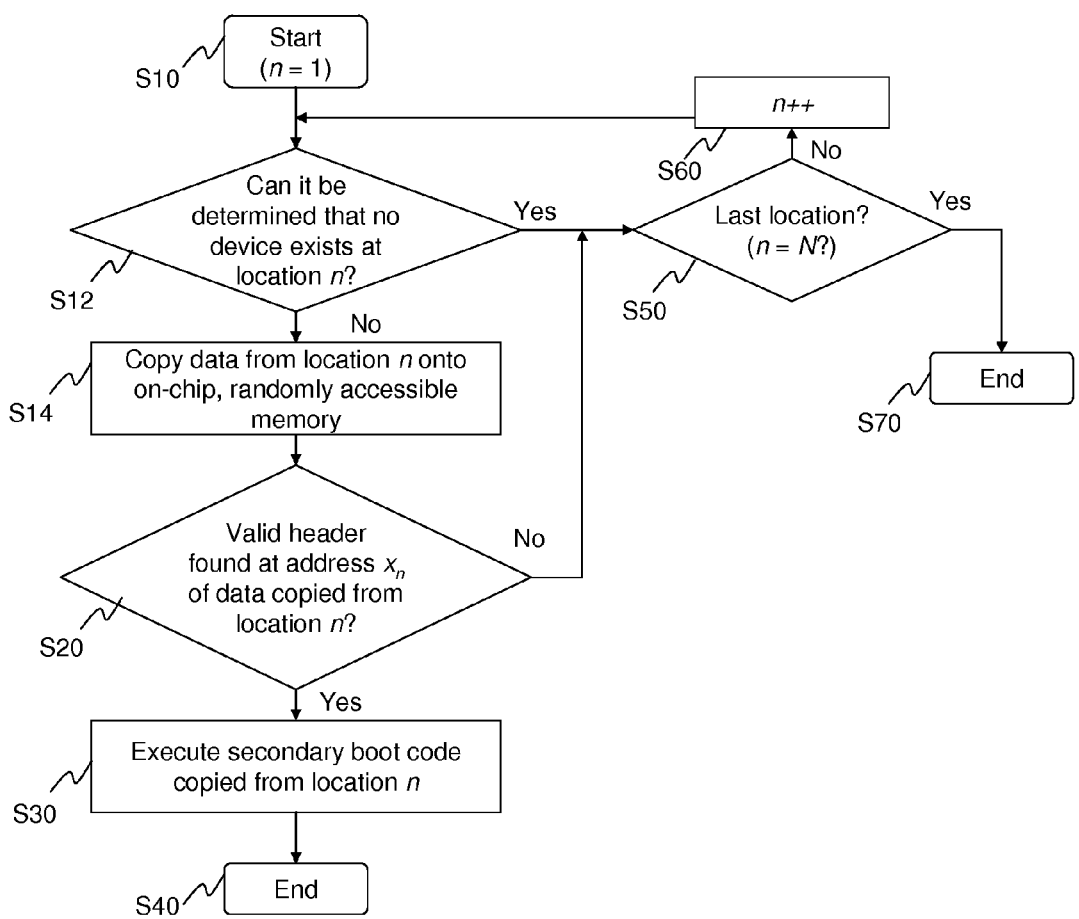

For a better understanding of the present invention and to show how it may be carried into effect, reference will now be made by way of example to the accompanying drawings in which:

FIG. 1 is a schematic block diagram of an embodiment of a processor in a user device, and FIG. 2 is a flow diagram showing an embodiment of a boot discovery algorithm.

DETAILED DESCRIPTION

The present invention provides a boot mechanism that can improve the flexibility of a boot and allow the maker of an IC chip to engage with a greater range of customers. In one embodiment, a method of booting a processor of an IC chip is disclosed. The method includes executing a primary boot code on the processor, including a boot discovery algorithm that checks each of a plurality of locations to determine the location of an external secondary boot source. The secondary boot code can be retrieved from the determined location and the booting of the processor can continue by executing the secondary boot code on the processor.

In one embodiment, the method may include indicating to the processor a selection between (1) a discovery mode in which a secondary boot source is determined using a boot discovery algorithm and (2) a fuse mode in which the location of the secondary boot source is determined by reference to one or more fuse latches. A choice, therefore, is provided for the IC maker in how to configure the boot source.

In further embodiments, the checking of the external locations may be performed in a predetermined order. The checking may include checking each of the locations to determine whether an external device is connected at that location. The checking may comprise checking one or more memory addresses of each of the locations for an indicator indicating the presence of secondary boot code. The checking may include copying data from each of the locations onto an on-chip, randomly accessible memory and checking the addresses using the copied data.

The retrieval of the secondary boot code may include copying the secondary boot code from the determined location onto an on-chip, randomly accessible memory and fetching the secondary boot code from the on-chip, randomly accessible memory to the processor. In one embodiment, at least one of the locations may include one of: a memory interface for connecting to an external memory, and a serial link for connecting to another device. Additionally, the primary boot source may be a ROM.

In one application, the secondary boot code may include code for configuring the processor for communication over a wireless cellular network, such that the execution of the secondary boot code by the processor may include configuring the processor for communication over the wireless cellular network. Embodiments of the present invention may have a particularly advantageous application for wireless signal processing, where a greater degree of flexibility is particularly desirable to help accommodate the possibility of different standards, radio access technologies, and the like for different customers and/or applications, etc.

FIG. 1 schematically illustrates a user device 10, including a mobile terminal or other wireless device such as a mobile phone, laptop wireless data card, PDA, etc. In one embodiment, the device 10 comprises an IC 1 having a processor 2 configured as a software modem or "soft modem" for communicating over a wireless cellular network. The principle behind software modem is to perform a significant portion of the signal processing and associated functions required for the wireless communications in a generic, programmable, reconfigurable processor, rather than in dedicated hardware.

The IC 1 comprises an RF interface (not shown), and the device 10 comprises RF front-end hardware (also not shown) including at least an antenna. The processor 2 may be programmed as a soft baseband modem. That is, on the receive side, all the radio functionality from receiving RF (radio frequency) signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain may be implemented in software stored in a memory and executed by the processor 2. In addition to this implementation, solutions where the RF/IF stage is not implemented by dedicated hardware are also envisaged.

In one implementation, the dedicated hardware in the receive part of the front-end may comprise a low noise amplifier, (LNA), mixers for downconversion of the received RF signals to IF and for downconversion from IF to baseband, RF and IF filter stages, and an analog to digital conversion (ADC) stage. An ADC is provided on each of in-phase and quadrature baseband branches for each of a plurality of receive diversity branches. The dedicated hardware in the transmit part of the front-end may comprise a digital to analogue conversion (DAC stage, mixers for upconversion of the baseband signals to IF and for upconversion from IF to RF, RF and IF filter stages, and a power amplifier (PA). Details of the required hardware for performing such basic radio functions will be known to a person skilled in the art.

The software may then handle functions such as:
Modulation and demodulation
Interleaving and deinterleaving
Rate matching and dematching
Channel estimation
Equalisation
Rake processing
Bit log-likelihood ratio (LLR) calculation
Transmit diversity processing
Receive diversity processing
Multiple transmit and receive antenna (MIMO) processing
Voice codecs
Link adaptation through power control or adaptive modulation and coding
Cell measurements.

In one embodiment, the chip used is made by Icera Inc., and sold under the trade name Livanto®. Such a chip has a specialised processor platform described, for example, in WO2006/117562.

An advantage of a soft modem type system is that it can be programmed and potentially reprogrammed to handle different protocols, algorithms, functions, radio access technologies and the like. For example, conventionally different radio access technologies would require different dedicated hardware to be included on a phone or other wireless terminal, and a terminal adapted to handle multiple radio access technologies or "multimode" terminal would have to include different sets of dedicated hardware. This problem is solved by software modem techniques, in which the differences in communicating according to different radio access technologies are handled in software. The processor could be programmed to handle both 2G and 3G cellular standards, including for example perhaps one or more of the GSM, UMTS, EDGE, DigRF, High Speed Downlink Packet Access (HSDPA), and High Speed Uplink Packet Access (HSUPA), and 3GPP Long Term Evolution (LTE) standards.

Alternatively or additionally, the use of software modem techniques may allow a maker or designer of a user device 10, or a manufacturer or distributor of the chip 1, to take a batch of generic or "standard agnostic" processors and then program them according to different radio standards or technologies for different customers or purposes. A soft modem could also be updated easily and inexpensively by reprogramming it to handle new or different technologies.

Thus to fully exploit the flexible nature of the soft modem, it can be seen that it would be useful to allow the processor 2 to boot from different boot sources. Particularly, it would be useful to be able to decide upon or change the boot source after the chip has been made.

According to embodiments of the present invention, the IC 1 and device 10 comprise a plurality of different boot sources. For example, the IC 1 may comprise a primary on-chip boot ROM 4 and a secondary on-chip boot-ROM (not shown)

which may be separate on-chip ROMs or different regions of the same on-chip ROM. The IC 1 may further comprise one or more external interfaces 6 to potential external sources of boot code, such as one or more external memory devices and/or one or more links to other devices external to the user device 10. In this example, the IC 1 comprises a first interface 6a to a first external memory 7a housed within the user device 10, a second interface 6b to a second external memory 7b housed within the user device 10, a third interface 6c to a first serial link 8a for connecting to another terminal other than user device 10 such as a separate computer, and a fourth interface 6d to a second serial link 8b. The first and second interfaces 6a and 6b could for example be part of a memory controller for connecting to externals memories such as a NAND flash, NOR flash, SDRAM or external secure ROM. Each of the third and fourth interfaces 6c and 6d may for example be a UART (universal asynchronous receiver/transmitter).

The IC 1 may also comprise a permanent, one-time writeable memory, in this case in the form of one or more banks of one or more fuse latches 5. These are fuses such as electronic fuses (E-fuses) which can be programmed by fusing selected fuses using an electric signal, or laser fuses which can be programmed by fusing selected fuses with a laser. Further, the IC 1 comprises an on-chip, randomly-accessible memory in the form of a RAM 11 comprising addressing logic configured to allow access to any of a plurality of addressed locations within that memory.

The interfaces 6 may each be memory-mapped on-chip peripherals, each operatively coupled to the processor 2 and addressable via a system interconnect 9. The processor 2 is also operatively coupled to the primary boot ROM 4, the fuse latches 5, and the RAM 11.

The chip is configured such that in operation, when the chip is either turned on or reset, the processor 2 automatically fetches and executes primary boot code from the on-chip primary boot ROM 4. The primary boot code, amongst other basic boot code for basic initialisation of the processor as will be familiar to a person skilled in the art, also contains code instructing the processor 2 to access and execute the secondary boot code from a secondary boot source (e.g., an external memory 7 or serial link 8) in order to initialise additional, customisable aspects of the system such as to configure (or partially configure) the processor 2 as a soft modem. To do this, the location of the secondary boot source is needed, which is achieved by means of a boot discovery algorithm in the primary boot code.

As a matter of terminology, in the described embodiments it is useful to think of the relevant interface 6 as being the "location" of the external boot source, because at the time of testing the locations it may still to be ascertained whether there is actually any external device connected there at all, and further where the interface is a memory addressable peripheral then the address of the interface is where the processor "sees" the external device. Also, if a plurality of sources are available via the same interface, a "location" could refer to a particular memory address or subset of addresses of the interface. But if connected by some alternative mechanism, the "location" could equally refer to the actual external location of the source device, or an identification of any kind of path or channel for uniquely reaching the source. The important point is that the boot algorithm is to discover where to obtain the secondary boot code.

The boot discovery algorithm is configured such that, when executed, it causes the processor 2 to check a plurality of potential locations of the secondary boot source. This may be done by checking each of the locations in turn, in a predetermined order, until it finds a valid source. To reduce boot time, the processor 2 may stop as soon as it finds a valid source, but it may alternatively check all of the possible locations. If multiple valid sources are found, the algorithm could resolve the ambiguity by reverting to some predefined default or criterion, or could load boot code from multiple sources.

Any suitable technique could be used to check a location for a valid source, but in one embodiment this is achieved as follows. The secondary boot code, which the algorithm is expecting to find, is stored according to some predetermined data structure. The data structure will comprise a header, which identifies the code as being secondary boot code. Thus to check a location, the algorithm attempts to read the relevant address (or addresses) at which the header would be found if present, and if it does find the expected header then this is an indication of a valid source of secondary boot code. The expected header addresses need not necessarily be the same for the different locations, and could for example be pre-known to the boot discovery algorithm or could be read by the algorithm from another known header of the data structure.

Note though that when reading from a serial interface (e.g., 6c or 6d), it is not usually possible to randomly access addresses on the corresponding external device: the data is presented as a stream of bits or bytes, and as a result is not possible to directly access the required header or execute code from the external device in question. Instead therefore, the algorithm reads serial data from the external device onto an on-chip, randomly-accessible memory such as the RAM 11. The data as copied onto the RAM 11 can then be randomly accessed (i.e., interrogated at any address) by the algorithm in order to look for the data structure header and if appropriate execute the secondary boot code.

Even if the external device is a memory device (e.g., 7a or 7b) rather than a serial link, it is not always possible to randomly access the data and/or to execute code directly from that device. As a result, the above procedure of first reading onto an on-chip RAM 11 may be used regardless of the type of the secondary boot-source device in question.

Other possible checks could include a check to determine whether any device is actually connected at a particular location at all. This could be used as preliminary check preceding another subsequent check, so that the subsequent check need not be performed if no device is found connected, which could avoid unnecessary machine cycles.

Turning now to FIG. 2, an example of an algorithm is described in relation to the flow chart of FIG. 2. Here the different possible locations of the secondary boot source are numbered from n=1 to N according to the order in which they are to be checked. The algorithm begins at step S10 with n set equal to 1. At the next step S12, the algorithm performs an initial "sanity check" to see if any device exists at the $n^{th}$ location (although this might not always be possible). If it is positively determined at this initial stage that no device is connected at the $n^{th}$ location, the algorithm proceeds to step S50 where it determines whether it has checked all locations yet, i.e., whether it has reached the $N^{th}$ location. If not, it increments n by 1 at step S60 and then returns to step S20 to repeat the process again for the next location in the order of checking.

If it is determined that a device is connected at the $n^{th}$ location on the other hand, or if it cannot be positively determined from the initial check that no device is connected, then the method proceeds to step S14 where the algorithm copies (or attempts to copy) a first portion of secondary boot image from the device at the $n^{th}$ location to the on-chip RAM 11. At the next step S20, the algorithm checks the copied data to see if there is a valid header at the relevant address $x_n$ of the $n^{th}$ location. If so, the algorithm has found a valid source, and so proceeds to step S30 where it causes the processor 2 to: copy the remaining portion of the secondary boot image from the device at the $n^{th}$ location to the RAM 11 (the size of the image may be indicated in the header), check the validity of the copied image such as by a Hash or RSA check, and fetch and execute the secondary boot code of the $n^{th}$ location from the RAM 11. This fetching may include transferring the code from the RAM 11 into another on-chip memory such as a cache from which the processor can execute it. The algorithm then ends at step S40.

If a valid header is not found however, then the location n does not have valid secondary boot code available. In that case, the algorithm proceeds to step S50 where it determines whether it has checked all locations yet, i.e., whether it has reached the $N^{th}$ location. If not, it increments n by 1 at step S60 and then returns to step S20 to repeat the process again for the next location in the order of checking.

If the algorithm has reached the final location N at step S50 however, this means no valid source of secondary boot code has been found anywhere. In that case, the algorithm proceeds to step S70 where it ends. This could include invoking some default boot option, such as booting from an on-chip secondary boot ROM (not shown); or could trigger an error handling routine. Alternatively, the algorithm could begin checking the locations again (e.g., return to step S20). Additionally, another option is to shut down all external interfaces and perform a chip reset after a predetermined amount of time, i.e., returning to step S20 to re-check upon reset.

In one particularly embodiment, the processor 2 may be configured so as to be selectively operable in either a "discovery mode" or a "fuse mode". In the discovery mode, the booting operates as discussed above by executing the boot discovery algorithm. In the fuse mode on the other hand, the secondary boot source is determined by reference to the bank of fuse latches 5, with the desired source being dependent on the value fused into those latches 5.

The selection as to mode could be indicated to the processor 2 in any suitable manner, for example by an indication input at an external pin or by a particular fuse latch state. One option is that the fuse state indicates either a fixed location or to use discovery mode: e.g., with four fuse-latch bits, values zero (0000) to fourteen (1110) could each specify a respective external interface to use, and a value of fifteen (all logic-ones) could indicate the use of the discovery mode.

To implement the different modes, the primary boot code could contain code which when executed causes the processor 2 to refer to the fuse latches 5 and then branches depending on the value fused therein. Alternatively, a dedicated hardware mechanism could be used.

In accordance with one embodiment, the above has been described in terms of the secondary boot code configuring the processor 2 as a soft-modem. Note that this could include the possibility of the secondary boot code operating the processor 2 to obtain the modem code image (or part of the modem image) from yet another device (a NOR/NAND flash for example) and to setup the external RAM interface(s).

It will be appreciated that the above embodiments are described only by way of example. In other embodiments for instance, the boot discovery algorithm could be applied to other platforms and/or for other purposes than a software modem. Other applications and configurations may be apparent to the person skilled in the art given the disclosure herein. The scope of the invention is not limited by the described embodiments, but only by the following claims.

What is claimed is:

1. A method of booting a processor of an integrated circuit chip, the method comprising:
   retrieving primary boot code from an on-chip primary boot source on the same chip as said processor, the primary boot code comprising at least a boot discovery algorithm for determining the location of an external secondary boot source external to said chip;
   executing the primary boot code on said processor, including the boot discovery algorithm, thus operating the processor to check each of a plurality of locations to determine the location of the external secondary boot source;
   retrieving a secondary boot code from the determined location; and
   continuing the booting of the processor by executing said secondary boot code on the processor.

2. The method according to claim 1, comprising indicating to the processor a selection between a discovery mode in which the secondary boot source is determined using said boot discovery algorithm and a fuse mode in which the location of the secondary boot source is determined by reference to one or more fuse latches.

3. The method according to claim 1, wherein the checking of the external locations is in a predetermined order.

4. The method according claim 1, wherein the checking comprises checking each of said locations to determine whether an external device is connected at that location.

5. The method according to claim 1, wherein the checking comprises checking one or more memory addresses of each of said locations for an indicator indicating the presence of secondary boot code.

6. The method of claim 5, wherein the checking comprises copying data from each of said locations onto an on-chip, randomly accessible memory and checking said addresses using the copied data.

7. The method of claim 1, wherein said retrieval of the secondary boot code comprises copying the secondary boot code from the determined location onto an on-chip, randomly accessible memory and fetching the secondary boot code from the on-chip, randomly accessible memory to the processor.

8. The method according to claim 1, wherein at least one of said locations comprises one of: a memory interface for connecting to an external memory, and a serial link for connecting to another device.

9. The method according to claim 1, wherein the primary boot source is a ROM.

10. The method according to claim 1, wherein the secondary boot code comprises code for at least partially configuring the processor for communication over a wireless cellular network, such that said execution of the secondary boot code by the processor comprises at least partially configuring the processor for communication over the wireless cellular network.

11. An integrated circuit chip comprising:
    an on-chip storage means being a primary boot source storing primary boot code;
    a plurality of input locations each being a potential location of an external secondary boot source storing secondary boot code; and
    a processor operatively coupled to the primary boot source and to the plurality of input locations;
    wherein the processor is configured to, upon booting, automatically retrieve and execute the primary boot code from the primary boot source; and the primary boot code comprises at least a boot discovery algorithm for determining the location of an external secondary boot source external to said chip, the algorithm being configured so as when executed to operate the processor to check each of said locations to determine the location of the external secondary boot source, retrieve the secondary boot code from the determined location, and continue the booting by executing the secondary boot code.

12. The circuit of claim 11, comprising one or more fuse latches operatively coupled to the processor and storing an indication to the processor, wherein the primary boot code is programmed to refer to the one or more fuse latches to select whether to operate in a discovery mode whereby the secondary boot source is determined using said boot discovery algorithm and a fuse mode in whereby the location of the secondary boot source is determined by reference to one or more fuse latches.

13. The circuit of claim 11, wherein the boot discovery algorithm is configured to check the external locations is in a predetermined order.

14. The circuit of claim 11, wherein the boot discovery algorithm is configured to check each of said locations to determine whether an external device is connected at that location.

15. The circuit of claim 11, wherein the boot discovery algorithm is configured to check one or more memory addresses of each of said locations for an indicator indicating the presence of secondary boot code.

16. The circuit of claim 15, wherein the boot discovery algorithm is configured to copy data from each of said locations onto an on-chip, randomly accessible memory and check said addresses using the copied data.

17. The circuit of claim 11, wherein the boot discovery algorithm is configured to retrieve the secondary boot code by operating the processor to copy the secondary boot code from the determined location onto an on-chip, randomly accessible memory and fetch the secondary boot code from the on-chip, randomly accessible memory to the processor.

18. The circuit of claim 11, wherein at least one of said locations comprises one of: a memory interface for connecting to an external memory, and a serial link for connecting to another device.

19. The circuit of claim 11, wherein the primary boot source is a ROM.

20. The circuit of claim 11, wherein the secondary boot code comprises code for at least partially configuring the processor for communication over a wireless cellular network, such that the execution of the secondary boot code by the processor comprises at least partially configuring the processor for communication over the wireless cellular network.

21. A computer program product stored on a non-transitory computer-readable medium and comprising code which when executed on a processor performs the steps of:
   beginning booting of the processor from a primary boot source comprising a boot discovery algorithm, thus operating the processor to check each of a plurality of locations to determine the location of the external secondary boot source;
   retrieving a secondary boot code from the determined location; and
   continuing the booting of the processor by executing said secondary boot code on the processor.

22. A user equipment comprising a wireless transceiver and an integrated circuit chip, the chip comprising:
   an on-chip storage means being a primary boot source storing primary boot code;
   a plurality of input locations each being a potential location of an external secondary boot source storing secondary boot code; and
   a processor operatively coupled to the primary boot source and to the plurality of input locations;
   wherein the processor is configured to, upon booting, automatically retrieve and execute the primary boot code from the primary boot source; and
   the primary boot code comprises at least a boot discovery algorithm for determining the location of an external secondary boot source external to said chip, the algorithm being configured so as when executed to operate the processor to check each of said locations to determine the location of the external secondary boot source, retrieve a secondary boot code from the determined location, and continue the booting by executing the secondary boot code in order to at least partially configure the processor for communication over a wireless cellular network via said wireless transceiver.

* * * * *